United States Patent
Sarrazin-Boucher

(10) Patent No.: US 10,616,317 B2
(45) Date of Patent: Apr. 7, 2020

(54) METHOD AND SYSTEM FOR AFFINITY LOAD BALANCING

(71) Applicant: Trilliant Networks, Inc., Redwood City, CA (US)

(72) Inventor: Charles Sarrazin-Boucher, Granby (CA)

(73) Assignee: Trilliant Networks, Inc., Redwood City, CA (US)

( * ) Notice: Subject to any disclaimer, the term of this patent is extended or adjusted under 35 U.S.C. 154(b) by 144 days.

(21) Appl. No.: 15/804,243

(22) Filed: Nov. 6, 2017

(65) Prior Publication Data

US 2018/0131756 A1   May 10, 2018

Related U.S. Application Data

(60) Provisional application No. 62/420,037, filed on Nov. 10, 2016.

(51) Int. Cl.
| | |
|---|---|
| *H04L 29/08* | (2006.01) |
| *G06F 9/48* | (2006.01) |
| *G06F 9/50* | (2006.01) |

(52) U.S. Cl.
CPC ........ *H04L 67/1008* (2013.01); *G06F 9/4881* (2013.01); *G06F 9/5033* (2013.01); *G06F 9/5083* (2013.01)

(58) Field of Classification Search
CPC .................................................. H04L 67/1008
USPC ........................................................ 709/226
See application file for complete search history.

(56) References Cited

U.S. PATENT DOCUMENTS

| | | | |
|---|---|---|---|
| 9,075,659 B2 | 7/2015 | Barzel et al. | |
| 2008/0046895 A1 | 2/2008 | Dillenberger et al. | |
| 2012/0023498 A1* | 1/2012 | Sundararaman | ...... H04L 47/621 718/102 |
| 2013/0179574 A1* | 7/2013 | Calder | ................. G06F 9/5033 709/226 |
| 2013/0179881 A1 | 7/2013 | Calder et al. | |
| 2014/0081685 A1* | 3/2014 | Thacker | ................. G06Q 10/06 705/7.12 |

FOREIGN PATENT DOCUMENTS

| | | |
|---|---|---|
| EP | 1672852 A2 | 6/2006 |
| KR | 100346667 B1 | 7/2002 |

OTHER PUBLICATIONS

International Search Report and Written Opinion dated Feb. 9, 2018 for PCT Application No. PCT/US2017/060323.

* cited by examiner

*Primary Examiner* — David R Lazaro
*Assistant Examiner* — Zia Khurshid
(74) *Attorney, Agent, or Firm* — Moser Taboada

(57) ABSTRACT

A computer implemented method and apparatus for affinity load balancing. The method comprises receiving a task request on a first server of a plurality of server, wherein a task associated with the task request is to be performed on a first device of a plurality of devices; extracting a task type and a device identifier from the task request; determining whether a second server of the plurality of server has acquired an affinity for the task type; and acquiring the affinity for the task type when it is determined the second server of the plurality of servers has not acquired an affinity for the task type.

20 Claims, 4 Drawing Sheets

METHOD AND SYSTEM FOR AFFINITY LOAD BALANCING

CROSS-REFERENCE

This application claims benefit of U.S. Provisional Application Ser. No. 62/420,037, filed Nov. 10, 2016, which are herein incorporated by reference in its entirety.

BACKGROUND OF THE INVENTION

Field of the Invention

Embodiments of the present invention generally relate to task management, and more specifically to affinity load balancing.

Description of the Related Art

Energy management requires a significant amount of interaction with devices, such as smart meters in order to perform types of tasks, such as meter reads, firmware upgrades, and the like. Customers, such as energy providers (e.g., an electric utility) request information from the devices via a task management service. A cluster of servers may be used to spread the workload of processing incoming task requests.

For example, a first task request may be received from an energy provider on server1, requesting a meter read of deviceA for a specified period of time. At the same time, a second task request may be received from a development group on server2, requesting a firmware upgrade of deviceA. If server1 accepts the first task, then server1 is said to have acquired an affinity for the task type of meter read. If server2 accepts the second task request, then server2 is said to have acquired an affinity for the task type of firmware upgrade. Going forward, server1 accepts all tasks of task type meter read. However, there is no mechanism in place to prevent single server to become overloaded by different affinity. As such, a server could acquire many affinities in the cluster while other servers are idle. This scenario causes system resources to slow down because all resources to process the tasks are being limited to the resources available on the single server.

Therefore, there is a need for a method and apparatus for affinity load balancing.

SUMMARY OF THE INVENTION

An apparatus and/or method is provided for affinity load balancing substantially as shown in and/or described in connection with at least one of the figures.

These and other features and advantages of the present disclosure may be appreciated from a review of the following detailed description of the present disclosure, along with the accompanying figures in which like reference numerals refer to like parts throughout.

Figure 1:
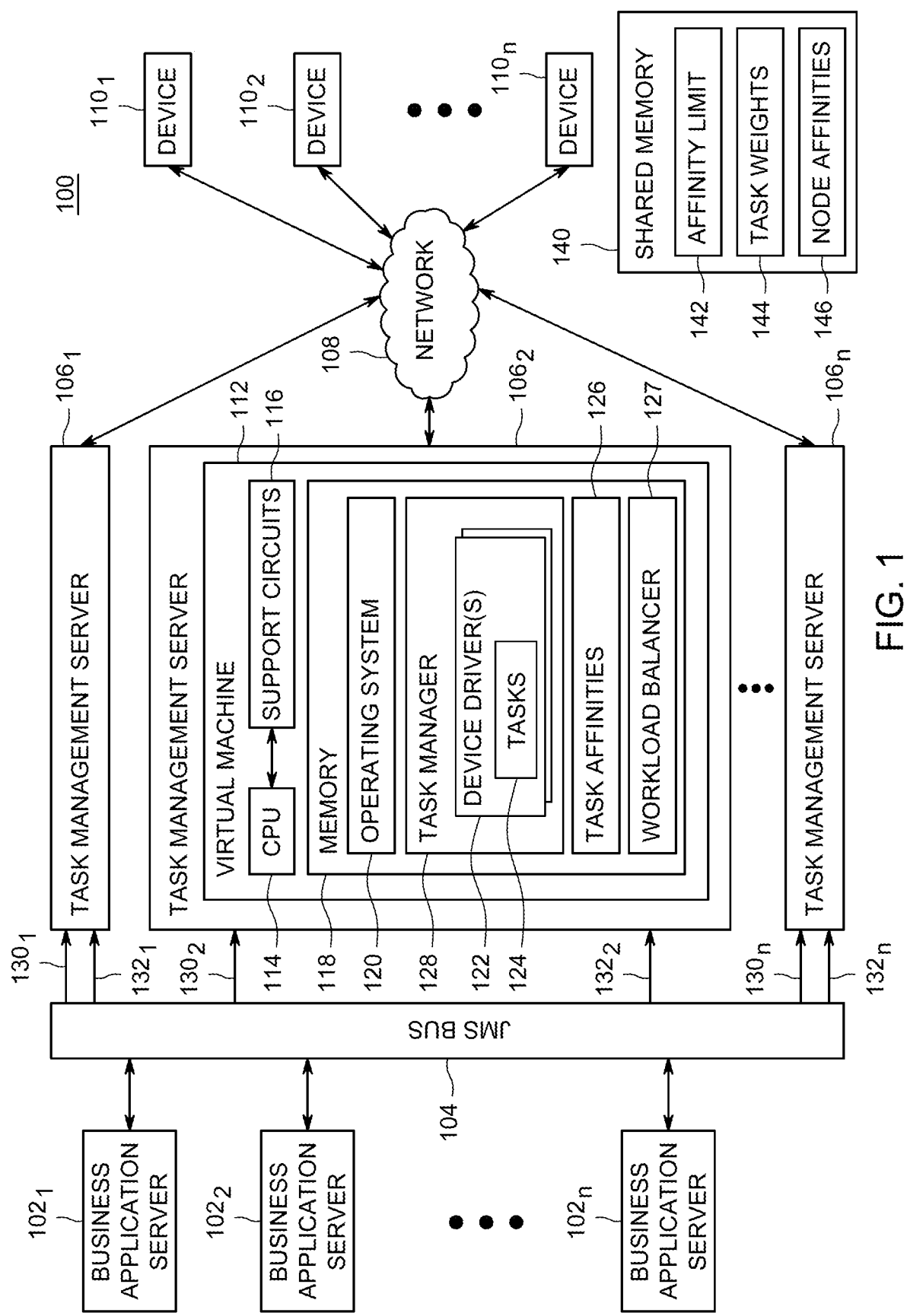
FIG. 1 depicts a block diagram of a system for affinity load balancing, according to one or more embodiments of the invention.

While the method and apparatus is described herein by way of example for several embodiments and illustrative drawings, those skilled in the art will recognize that the method and apparatus for affinity load balancing is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for efficient task management defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for a system and method for affinity load balancing. A task request is received on a first server. The received task may be a task that requires communication with a device. For example, the received task request may be "Get meter read from deviceABC for the time period X." In such case, the received task is to be executed on a specific device. However, the received task may not require communication with a device, but rather be, for example a request for a device driver to execute a report. Each task has a type, for example a meter read, a firmware upgrade, run a report, and the like. A task manager determines whether the current server (i.e., the server that received the request) has an affinity to the task type. If the current server does not have an affinity to the task type, it is determined whether another server in the cluster has an affinity to the task type. If another server has already acquired an affinity to the task type, the task request is released on a named queue such that the task is delivered directly to the server with an affinity to the task type. However, if no other server in the cluster has an affinity to the task type access, the current server may acquire an affinity to the task type at which time the current server accepts the task request, generates a task, an if applicable, delivers it to a device driver associated with the device, which in turn facilitates forwarding the task toward the device for execution.

As used herein, a server may have an "affinity" for a given task type. The affinity defines where the task should be generated and executed (or sent to the device for execution). As described above, a server may have an affinity to a given task based on the specific type of task to be executed or based on whether a communication channel is currently open to a device on which the task is to be executed. The number of servers that may have an affinity for a specific task type may be defined by a configurable limit. However, for simplicity, the present disclosure describes an affinity's server limit for each task type as a limit of one (1).

Various embodiments of a method and apparatus for affinity load balancing are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. Although the present application is described using a JAVA environment, for example, a Java Messaging Service (JMS) bus, a Java Virtual Machine (JVM), and the like, one skilled in the art will appreciate that any program language protocols may be used to perform the disclosed invention. Although the present application describes the invention using servers connected to smart meters, one skilled in the art will appreciate that any the present invention may be implemented on specific or general purpose computers (e.g., cloud servers) that communicate with devices. It is appreciated that the term "server" and "node" are used interchangeably.

FIG. 1 depicts a block diagram of a system 100 for affinity load balancing, according to one or more embodiments of the invention.

The system 100 includes a plurality of business servers $102_1$, $102_2$, . . . $102_n$ (collectively referred to herein as business servers 102). The business servers 102 submit requests via a message routing server, such as JMS bus 104. The JMS bus 104 provides messages to a plurality of servers $106_1$, $106_2$, . . . $106_n$ (collectively referred to herein as servers 106) via generic queue $130_1$, $130_2$, . . . $130_n$ (collectively referred to herein a generic queue 130). The servers 106 receive the requests submitted by the business servers 102 and execute each request towards at least one of a plurality of devices $110_1$, $110_2$, . . . , $110_n$ (collectively referred to herein as devices 110). The devices 110 are communicatively coupled to the servers 106 via network 108. In some embodiments, each of the plurality of devices $110_1$, $110_2$, . . . , $110_n$ is a smart meter. The servers 106 are communicatively coupled to a shared memory 140 within an internal servers' network. The servers 106 communicate with the shared memory 140 in order to access an affinity limit 142, task weights 144, and node affinities 146, which are used for load balancing. The affinity limit 142 is a configurable value that identifies a maximum number of affinities (i.e., task types) a given server may acquire. The task weights 144 identify configurable values for task types on specific types of devices. For example, a firmware upgrade on a smart meter may be configured to have a task weight of 10, but a firmware upgrade on a thermostat may require less processing power and therefore have a task weight of 2. As another example, the generation of a report by a device driver may monopolize resources for an extended period of time and therefore may have a task weight of 8. These task weights are used in load balancing as described in further detail below with respect to FIG. 3. The node affinities 146 are a list of task types and which server(s) currently have an affinity to each task type as well as a reference count of each task type currently being processed on the server. The shared memory 140 may be a remote server accessible by all servers 106, or a replicated memory within each of the plurality of servers 106.

In some embodiments, the servers 106 are a plurality of physical machines. In some embodiments, each of the servers 106 may include one or more virtual machines 112, such as a JAVA Virtual Machine (JVM). Each of the servers 106, or in the case where a server 106 includes one or more virtual machines 112, each virtual machine 112, includes a Central Processing Unit (CPU) 114, support circuits 116, and a memory 118. The CPU 114 may include one or more commercially available microprocessors or microcontrollers that facilitate data processing and storage. The various support circuits 116 facilitate the operation of the CPU 114 and include one or more clock circuits, power supplies, cache, input/output circuits, and the like. The memory 118 includes at least one of Read Only Memory (ROM), Random Access Memory (RAM), disk drive storage, optical storage, removable storage and/or the like.

The memory 118 includes an operating system 120, a list of task affinities 126 acquired by the server 106, a workload balancer 127, and a task manager 128. The task manager 128 includes a plurality of device drivers 122. Each of the plurality of device drivers 122 includes one or more tasks 124 that may be executed on a device 110. The operating system 120 may include various commercially known operating systems. The number of device drivers 122 on a server 106 is equal to the number of types of devices such that tasks may be sent in parallel to multiple different devices. In some embodiments, there is a one-to-one correspondence between a device driver 122 and a device 110 on each server 106. However, there may be difference device types using a same device driver if the different device types if the device types have the same behavior (e.g., different models of a device).

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like. When a business application requires information regarding a device 110, for example, when the business application needs to read an energy profile for a given timeframe, the business server 102 submits a request on the JMS bus 104. Each device driver 122 dictates the behavior for a specific device type. For example, device driver "A" knows how to interact with an electric meter produced by "ABC Company" for the model "A1". As such, the device driver 122 fetches/receives from the JMS bus 104 only tasks which are dedicated to a device which is of the type "ABC Company/A1". When a task request is produced and given to the JMS bus 104, there is a mechanism in place which allows a pre-filtering onto the task type in order to allow each device driver 122 to retrieve tasks which are dedicated to their device driver. This way, when the device driver 122 connects to JMS bus 104, the device driver 122 connects by stating which device task type the device driver 122 wants. From the previous example above, upon connection, the device driver "A" would indicate to the JMS bus 104 to provide the device driver tasks which are only of the type "ABC Company/A1", because it is only those tasks that this device driver can understand.

In some embodiments, the JMS bus 104 submits the request to a first available server 106. In some embodiments, the JMS bus 104 thereafter submits requests to servers 106 in a round-robin manner. In some embodiments, the round robin order is based on the order in which the servers 106 connected to the JMS bus 104. The JMS bus 104 submits the request on a generic queue 130. A device driver $122_1$ on the server $106_1$ retrieves the request from the generic queue 130. For example, the request may be for a meter read from the meter with serial number 123 for the timeframe of 8 am-10 am. If the task request is one that is to be performed on a specific device, the task manager 128 determines to which device 110 the request is to be executed. The task manager 128 accesses the task affinities 126 in order to determine whether the current server (in the present example, server $106_1$) has an affinity to the task type. If the present server does not have an affinity to the task type, the task manager 128 determines whether another server 106 in the cluster has an affinity to the task type by accessing the shared memory 140 and determining from the node affinities 146 whether another node has acquired an affinity to the task type. If another server 106 has already acquired an affinity to the task type, the task manager 128 will release the task request on a named queue 132 such that the task is delivered directly to the server with an affinity to the task type. However, if based on the node affinities 146, no other server 106 has an affinity to the task type, the current server accesses the affinity limit 142 on the shared memory 140 in order to determine if the current server may accept any additional affinities. If no other server 106 has an affinity to the present task type and the current server is able to acquire additional affinities, the current server accepts the task request, updates the node affinities 146 in the shared memory 140 and proceeds to generate a task toward the device 110. In embodiments where a server 106 includes one or more VMs 112, a task may be sent from a first VM 112 to a second VM 112 on a same server 106.

A server may release a task affinity when the server has executed all tasks of a specific type. When a server acquires an affinity to a task type, a reference count of the number of tasks of the specific task type is incremented by 1. When a task is completed, the reference count is decreased by 1. When the reference count reaches zero, the server no longer has an affinity for the task type. In other words, the server releases its affinity.

Figure 2:
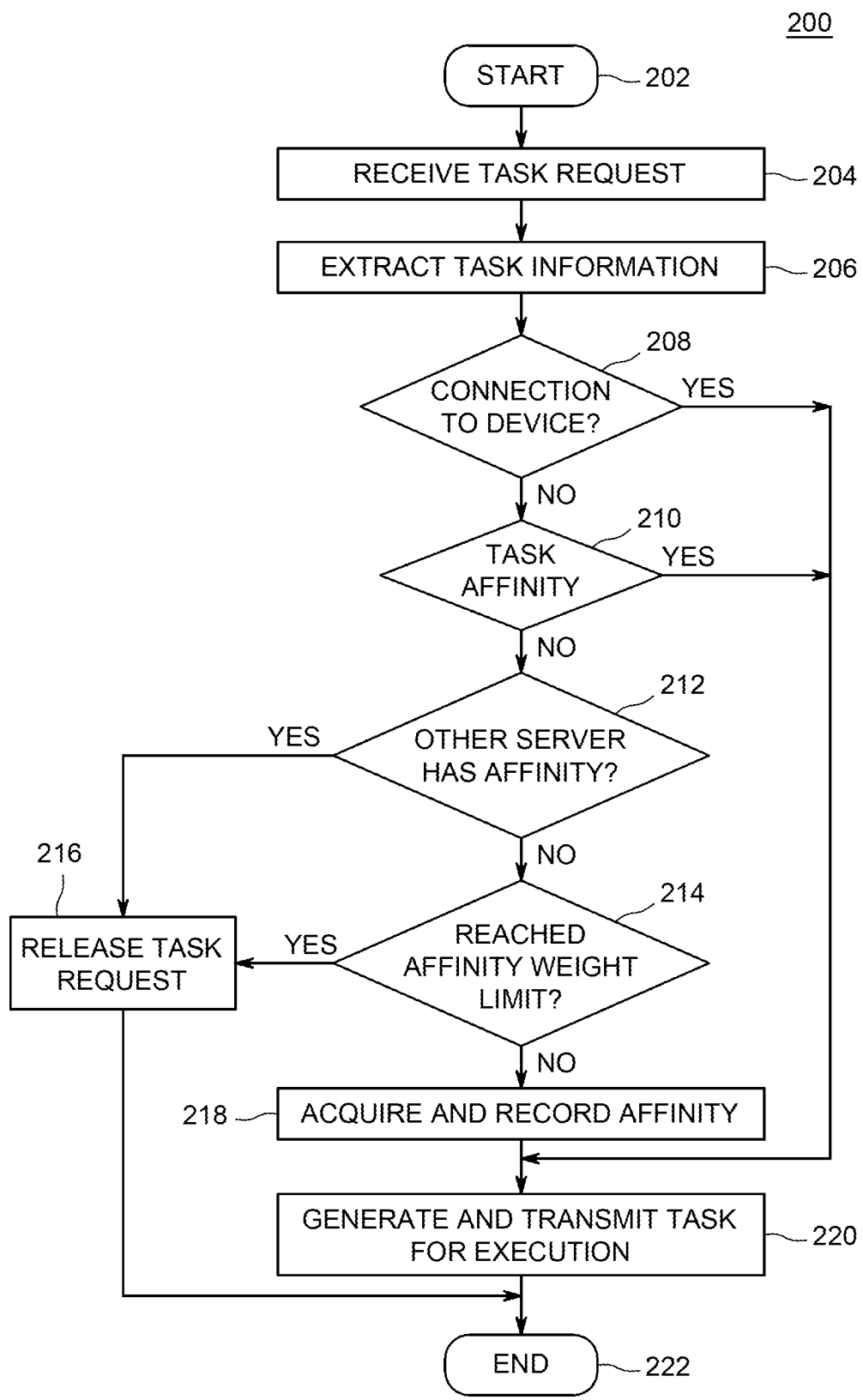
FIG. 2 depicts a flow diagram of a method for affinity load balancing, according to one or more embodiments of the invention.

FIG. 2 depicts a flow diagram of a method 200 for affinity load balancing, according to one or more embodiments of the invention. The method 200 starts at step 202 and proceeds to step 204.

At step 204, a request is received on a server, where the server is one server of a plurality of servers in a cluster. In some embodiments, the request is received via a generic queue on a JMS bus. The request may be from a business application server. The request identifies what task is to be performed on which device. The task is of a specific task type, such as meter read, firmware upgrade, and the like. For example, the request may be to perform a firmware upgrade on a smart meter with serial number 123.

At step 206, the task information is extracted from the task request. Task information includes at least the type of task, and a device identifier that identifies the device on which the task is to be performed. The task manager parses the task request in order to extract the task information.

At step 208, the task manager determines whether the current server (i.e., the server on which the task was received) has a communication channel open to the device (i.e., has a communication affinity). The task manager determines from the task information, on which device the task is to be performed. In the present example, the device is smart meter 123. The task manager determines whether a communication channel is currently opened to the device. If a communication channel is open, then the method 200 proceeds to step 220, where the task manager generates a task and sends the task to the device driver associated with the device, which in turn transmits the task for execution on the device.

However, if at step 208, it is determined that a connection is not open to the device, then at step 210, the task manager determines whether the current server has an affinity to the task type associated with the task request (i.e., current task type). The task manager accesses a local list of task affinities stored on the server to determine if the task type is of the type that the current server has acquired an affinity. If it is determined that the current server has an affinity to the task type, then the method 200 proceeds to step 220, where the task manager generates a task and sends the task to the device driver associated with the device, which in turn transmits the task for execution on the device.

However if at step 210, it is determined that the current server has not acquired an affinity to the current task type, then at step 212, the task manager determines whether another server in the cluster has acquired an affinity to the task type. The task manager accesses a memory that is shared by all servers in the cluster to determine if there is another server that has acquired an affinity to the task type. If it is determined that another server has acquired an affinity to the task type, then at step 216, the task manager releases the task type back to the JMS bus on a named queue, such that the task is received by the named server that has an affinity to the task type.

However, if at step 212 it is determined that no other server has an affinity to the task type, then at step 214, the task manager determines whether the current server has reached the affinity weight limit. The affinity weight limit is a configurable number based on the weight of each affinity (i.e., task types) that a single server may acquire. For example, a first server may hold ten (10) different affinities where each affinity has a weight value of two (2). A second server may hold one (1) affinity that requires a significant amount of physical resources (CPU, memory, network bandwidth), which has a weight of 20. If the system is configured to accept up to an affinity weight of 20, then both the first server and the second server are at full affinity capacity even though the first server holds ten affinities and the second server holds only one. The task manager retrieves the affinity limit from the shared memory and compares the affinity limit to the current number owned by the server. If it is determined that the current server has reached the limit the server may acquire, then the method proceeds to step 216, where the task request is released back onto a generic queue of the JMS bus.

However, if at step 214, it is determined that the affinity limit has not been reached by the current server, then the current server acquires the affinity and records the affinity in the memory of the server as well as on the shared memory. The method proceeds to step 220, where the task manager generates a task and sends the task to the device driver associated with the device, which in turn transmits the task for execution on the device.

The method 200 ends at step 222.

Figure 3:
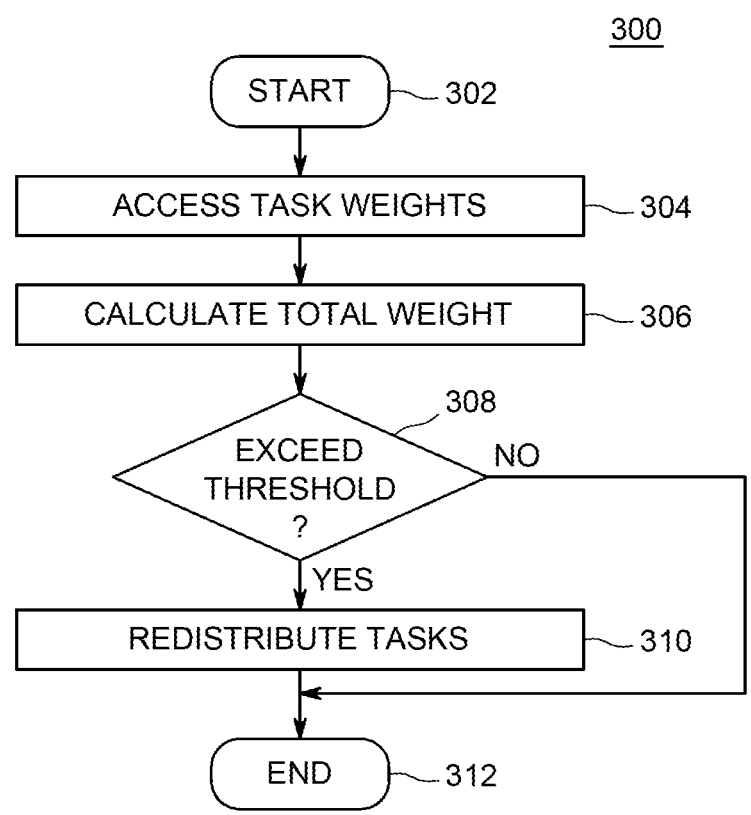
FIG. 3 depicts a flow diagram of a method for affinity load balancing, according to one or more embodiments of the invention.

FIG. 3 depicts a flow diagram of a method 300 for affinity load balancing, according to one or more embodiments of the invention. The method 300 is performed by a workload balancer on a server. The method 300 starts at step 302 and proceeds to step 304.

At step 304, the workload balancer accesses a plurality of task weights from a shared memory. Each task type weight is a predefined configurable value that represents the processing power, time, bandwidth, and/or the like, required to perform the task type on the device type. For example, a firmware upgrade may be given a task weight of ten (10) on a device of a first device type, and given a weight of two (2) on a device of a second device type. which is handled by another device driver. The value of the task weight is based on an arbitrary choice which can be influenced by, for example the processing power required, network resources required, memory consumption or even user needs. A user may decide to increase the weight of a specific task in order to limit through time the number of tasks done (since it is reducing the servers' resources availability).

At step 306, the total weight of all task requests on the server is calculated using the task weights. At step 308, the calculated total weight is compared to a predefined threshold weight for a server to determine whether the total weight exceeds the threshold weight. If it is determined that the total weight does not exceed the threshold weight, then the method 300 proceeds to step 312 and ends.

However, if it is determined that the total weight exceeds the threshold weight, then at step 310, the workload of the server is distributed among the servers in the cluster. The task request is returned to the generic queue. In order for another server to order for another server to start processing the task, the server needs to acquire an affinity for said task type. If the server cannot acquire the affinity, the server will bounce the task to a named queue dedicated to the server that currently holds this affinity.

The method 300 ends at step 312.

Figure 4:
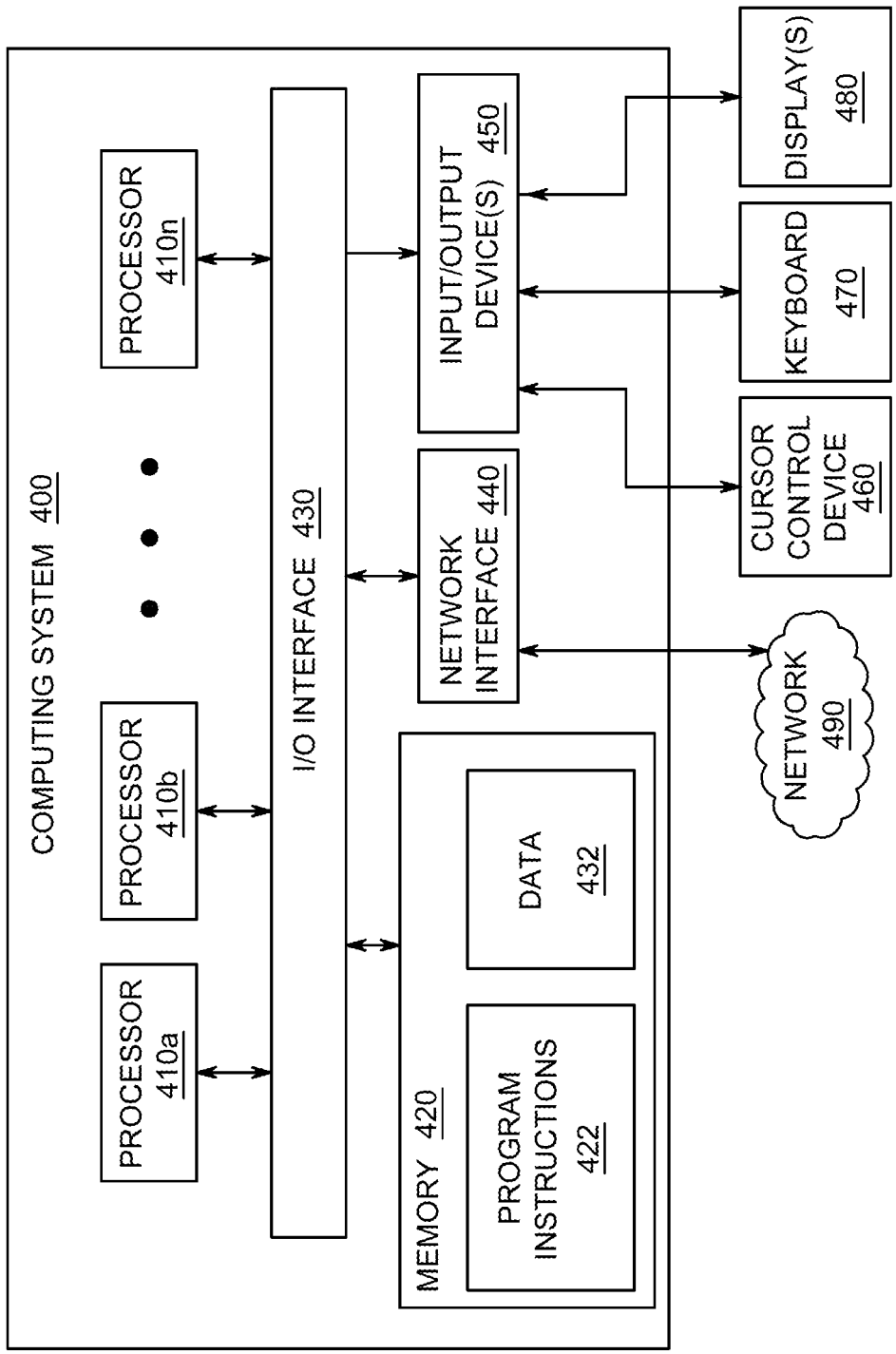
FIG. 4 depicts a computer system that can be utilized in various embodiments of the present invention to implement the computer and/or the display, according to one or more embodiments of the invention.

FIG. 4 depicts a computer system 400 that can be utilized in various embodiments of the present invention to implement the computer and/or the display, according to one or more embodiments.

Various embodiments of method and apparatus for affinity load balancing, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the method 200 and method 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the operations described with respect to FIG. 1 and the methods illustrated by the flowcharts of FIG. 2 and FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for affinity load balancing comprising:
receiving a task request on a first server of a plurality of server, wherein a task associated with the task request is associated with a task weight that represents at least one of processing power, processing time, or bandwidth required to perform the task, and wherein the task associated with the task request is to be performed on a first device of a plurality of devices;
extracting a task type and a device identifier from the task request;
determining whether a second server of the plurality of server has acquired an affinity for the task type, wherein the first server is different from the second server;
determining whether an affinity limit has been reached on the first server;
determining whether an affinity weight limit has been reached on the first device; and
acquiring the affinity for the task type when it is determined the second server of the plurality of servers has not acquired an affinity for the task type and when it is determined the first server has not exceeded the affinity limit and the affinity weight limit.

2. The method of claim 1, further comprising transferring the task request when it is determined that the second server of the plurality of servers has an affinity for the task type.

3. The method of claim 2, further comprising incrementing a reference count of a task type for the second server of the plurality of servers.

4. The method of claim 2, wherein transferring the task request comprises sending the task request to a named queue for the second server.

5. The method of claim 1, further comprising:
determining whether an affinity limit has been reached on the first server; and
releasing the task request when an affinity weight limit has been reached.

6. The method of claim 1, wherein determining whether a second server of the plurality of servers that has an affinity for the requested task comprises:
transmitting a request to a shared memory; and
receiving in response to the request an indication of which server of the plurality of servers has an affinity for the task associated with the task request.

7. The method of claim 6, wherein determining further comprises determining the server indicated in the response has a reference count of greater than zero for the affinity.

8. The method of claim 1, further comprising, upon acquiring an affinity to the task type, performing the steps of:
generating a task based on the task request; and
providing the generated task to a device driver for the first device, wherein providing the generated task causes the device driver to transmit the generated task to the first device for execution.

9. The method of claim 8, further comprising storing in a shared memory an indication that the first server has acquired an affinity for the task type.

10. The method of claim 1, wherein the first server and the second server are virtual machines on a same server.

11. A system for affinity load balancing for a plurality of servers, comprising:
a) at least one processor;
b) at least one input device; and
c) at least one storage device storing processor-executable instructions which, when executed by the at least one processor, perform a method including:
receiving a task request on a first server of a plurality of server, wherein a task associated with the task request is associated with a task weight that represents at least one of processing power, processing time, or bandwidth required to perform the task, and wherein the task associated with the task request is to be performed on a first device of a plurality of devices;
extracting a task type and a device identifier from the task request;

determining whether a second server of the plurality of server has acquired an affinity for the task type, wherein the first server is different from the second server;

determining whether an affinity limit has been reached on the first server;

determining whether an affinity weight limit has been reached on the first device; and acquiring the affinity for the task type when it is determined the second server of the plurality of servers has not acquired an affinity for the task type and when it is determined the first server has not exceeded the affinity limit and the affinity weight limit.

12. The system of claim 11, the method executed by the at least one processor further comprises transferring the task request when it is determined that the second server of the plurality of servers has an affinity for the task type.

13. The system of claim 12, the method executed by the at least one processor further comprises incrementing a reference count of a task type for the second server of the plurality of servers.

14. The system of claim 12, wherein transferring the task request comprises sending the task request to a named queue for the second server.

15. The system of claim 11, the method executed by the at least one processor further comprises:

determining whether an affinity limit has been reached on the first server; and releasing the task request when an affinity weight limit has been reached.

16. The system of claim 11, wherein determining whether a second server of the plurality of servers that has an affinity for the requested task comprises:

transmitting a request to a shared memory;

receiving in response to the request an indication of which server of the plurality of servers has an affinity for the task associated with the task request; and determining the server indicated in the response has a reference count of greater than zero for the affinity.

17. The system of claim 11, the method executed by the at least one processor further comprises, upon acquiring an affinity to the task type, performing the steps of:

generating a task based on the task request; and providing the generated task to a device driver for the first device, wherein providing the generated task causes the device driver to transmit the generated task to the first device for execution; and storing in a shared memory an indication that the first server has acquired an affinity for the task type.

18. The system of claim 11, wherein the first server and the second server are virtual machines on a same server.

19. A non-transitory computer readable medium for storing computer instructions that, when executed by at least one processor causes the at least one processor to perform a method for affinity load balancing, comprising:

receiving a task request on a first server of a plurality of server, wherein a task associated with the task request is associated with a task weight that represents at least one of processing power, processing time, or bandwidth required to perform the task, and wherein the task associated with the task request is to be performed on a first device of a plurality of devices;

extracting a task type and a device identifier from the task request;

determining whether a second server of the plurality of server has acquired an affinity for the task type, wherein the first server is different from the second server;

determining whether an affinity limit has been reached on the first server;

determining whether an affinity weight limit has been reached on the first device; and acquiring the affinity for the task type when it is determined the second server of the plurality of servers has not acquired an affinity for the task type and when it is determined the first server has not exceeded the affinity limit and the affinity weight limit.

20. The non-transitory computer readable medium of claim 19, further comprising:

transferring the task request when it is determined that the second server of the plurality of servers has an affinity for the task type, wherein transferring the task request comprises sending the task request to a named queue for the second server; and incrementing a reference count of a task type for the second server of the plurality of servers.

* * * * *